(12) United States Patent
Schepmann et al.

(10) Patent No.: US 9,352,635 B1
(45) Date of Patent: May 31, 2016

(54) ENERGY CONTROL MECHANISMS FOR AN ELECTRIC VEHICLE

(71) Applicant: Proterra Inc., Greenville, SC (US)

(72) Inventors: Seneca A. Schepmann, Greenville, SC (US); Robert Clippard, Simpsonville, SC (US); Tim Stafford, Greer, SC (US)

(73) Assignee: Proterra Inc., Greenville, SC (US)

( * ) Notice: Subject to any disclaimer, the term of this patent is extended or adjusted under 35 U.S.C. 154(b) by 0 days.

(21) Appl. No.: 14/675,200

(22) Filed: Mar. 31, 2015

(51) Int. Cl.
*B60L 11/00* (2006.01)
*B60H 1/00* (2006.01)
*B60L 11/18* (2006.01)

(52) U.S. Cl.
CPC ........ *B60H 1/00735* (2013.01); *B60L 11/1809* (2013.01); *B60L 11/1861* (2013.01); *B60L 11/1874* (2013.01); *B60L 11/1875* (2013.01); *Y10S 903/903* (2013.01)

(58) Field of Classification Search
CPC .......... B60H 1/00428; B60H 1/00278; B60H 1/2225; Y02T 10/7005; Y02T 90/14; Y02T 10/92; B60L 11/1861; B60L 2240/34; B60W 2240/545; H02J 2007/005
USPC ...................... 701/22; 165/202, 203, 205, 42; 320/132, 109, 135; 180/65.21
See application file for complete search history.

(56) References Cited

U.S. PATENT DOCUMENTS

| | | | |
|---|---|---|---|
| 6,988,670 B2 | 1/2006 | Keen et al. | |
| 2010/0236770 A1* | 9/2010 | Pursifull | B60H 1/00764 165/202 |
| 2011/0202234 A1* | 8/2011 | Bradley | B60K 6/48 701/36 |
| 2013/0020046 A1* | 1/2013 | Momose | B60H 1/00428 165/11.1 |
| 2013/0269921 A1* | 10/2013 | Kusumi | B60H 1/00385 165/202 |
| 2014/0083672 A1 | 3/2014 | Rollinson et al. | |
| 2015/0191073 A1* | 7/2015 | Bjorkerud | B60H 1/00778 454/75 |
| 2015/0217623 A1* | 8/2015 | Hatakeyama | B60L 1/003 165/42 |
| 2015/0277869 A1* | 10/2015 | Gschwind | G06F 8/443 717/153 |

OTHER PUBLICATIONS

Bullis, Kevin, "Electric Vehicles Out in the Cold: Electric vehicle range drops in cold weather, and technological solutions are years away.", Dec. 13, 2013, MIT Technology Review, available at <http://technologyreview.com/news/522496/electric-vehicles-out-in-the-cold/>, (3 pages).

* cited by examiner

*Primary Examiner* — Marthe Marc-Coleman
(74) *Attorney, Agent, or Firm* — Bookoff McAndrews, PLLC (57) ABSTRACT

A method of controlling an electric vehicle having an HVAC system configured to condition a passenger cabin of the electric vehicle, and one or more batteries configured to provide energy to the HVAC system, may include controlling an output of the HVAC system based on one or more of a charging state of the one or more batteries, a state of charge of the one or more batteries, and an ambient temperature outside of the electric vehicle.

20 Claims, 7 Drawing Sheets

ENERGY CONTROL MECHANISMS FOR AN ELECTRIC VEHICLE

TECHNICAL FIELD

The current disclosure relates to energy control mechanisms for an electric vehicle. In particular, the current disclosure relates to devices and methods for increasing the energy efficiency of HVAC systems in electric buses.

BACKGROUND

Typically, a vehicle operator has complete control of the vehicle's HVAC system. The operator sets a desired cabin temperature, and the HVAC system attempts to meet this desired cabin temperature without regard to ambient conditions or the state of the vehicle.

A wide variety of vehicles use an HVAC system in an automotive or transit application. Historically, fuel efficiency of the HVAC system has not been a primary concern in vehicle design, as many vehicles generally have access to large energy stores like fuel tanks and/or permanent attachments to an electric grid.

The present disclosure addresses some of these aspects of the prior art and/or other aspects of the prior art.

SUMMARY

Embodiments of the present disclosure relate to, among other things, energy control mechanisms for electric vehicles. Each of the embodiments disclosed herein may include one or more of the features described in connection with any of the other disclosed embodiments.

In one aspect the present disclosure may be directed to a method of controlling an electric vehicle having an HVAC system configured to condition a passenger cabin of the electric vehicle, and one or more batteries configured to provide energy to the HVAC system, may include controlling an output of the HVAC system based on one or more of a charging state of the one or more batteries, a state of charge of the one or more batteries, and an ambient temperature outside of the electric vehicle.

In another aspect, the present disclosure may be directed to a method of charging an electric vehicle having a passenger cabin, an HVAC system configured to condition the air within the passenger cabin, and one or more batteries configured to provide energy to the HVAC system. The method may include controlling one or more parameters of the HVAC system to achieve a temperature setpoint within the passenger cabin, and receiving a user-selected temperature setpoint. The method may also include setting the temperature setpoint as the user-selected temperature setpoint, and determining whether the one or more batteries are in a charge cycle. When the HVAC system is cooling the passenger cabin and the one or more batteries are in a charge cycle, the method may include reducing the temperature setpoint from the user-selected temperature setpoint, and when the HVAC system is heating the passenger cabin and the one or more batteries are in the charge cycle, the method may include increasing the temperature setpoint from the user-selected temperature setpoint.

In yet another aspect, the present disclosure may be directed to a control system for an electric vehicle. The control system may include an HVAC system configured to condition air within a passenger cabin of the electric vehicle, one or more batteries configured to provide energy to the HVAC system. The control system may also include a control unit configured to control an output of the HVAC system based on one or more of a charging state of the one or more batteries, a state of charge of the one or more batteries, and an ambient temperature outside of the electric vehicle.

BRIEF DESCRIPTION OF THE DRAWINGS

The accompanying drawings, which are incorporated in and constitute a part of this specification, illustrate exemplary embodiments of the present disclosure and together with the description, serve to explain the principles of the disclosure.

DETAILED DESCRIPTION

The present disclosure describes energy control mechanisms for electric vehicles (e.g., electric buses). More specifically, the present disclosure relates to methods for maintaining the temperature of a passenger cabin in an energy efficient manner. The methods of the present disclosure may minimize energy consumption (e.g., electrical energy consumption) while still providing acceptable levels of passenger comfort. While principles of the current disclosure are described with reference to an electric bus, it should be understood that the disclosure is not limited thereto. Rather, the systems and methods of the present disclosure may be used in association with any electric vehicle (cars, two-wheelers, trains, and hybrid vehicles that are also powered by combustion-engines).

Figure 1:
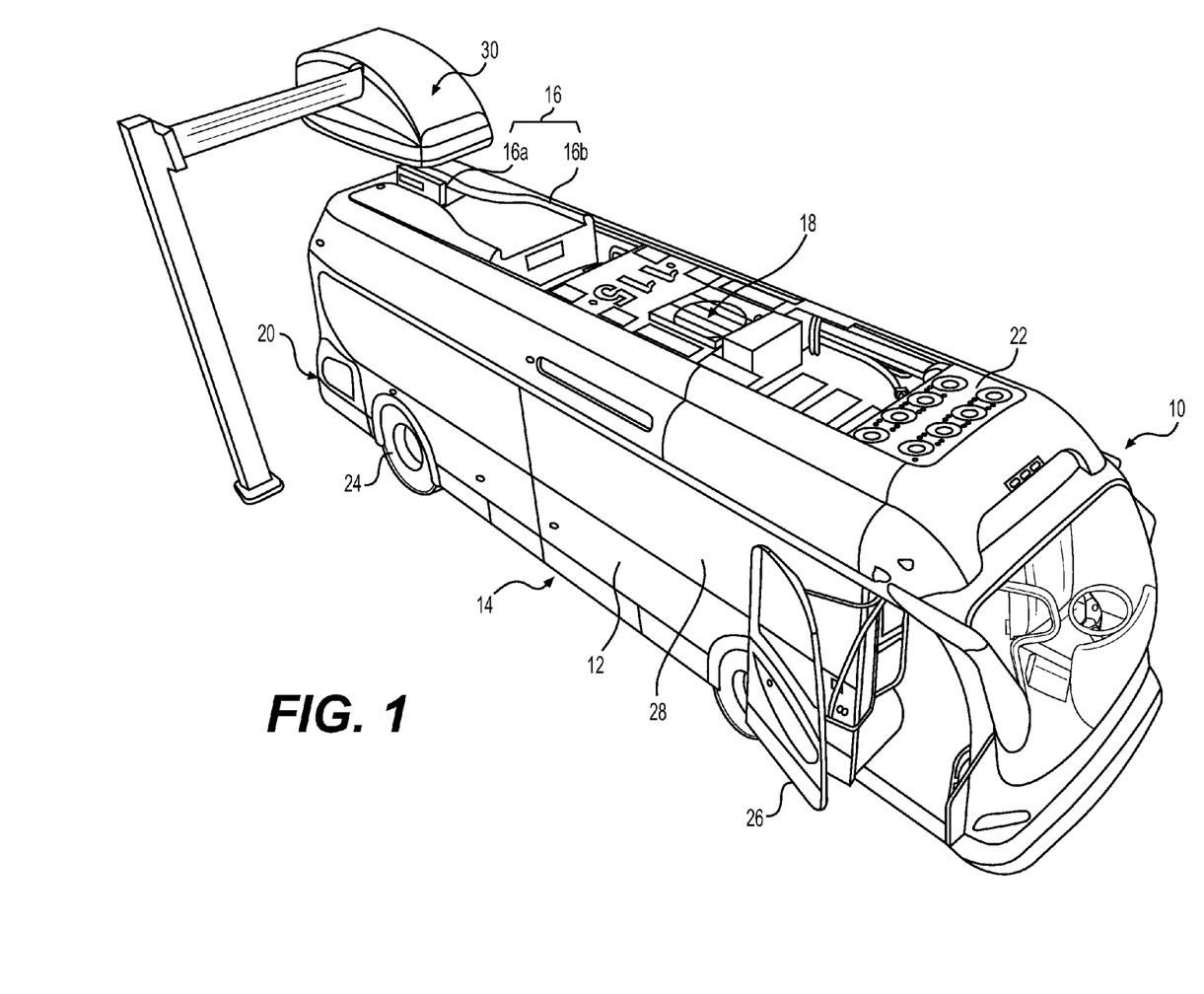
FIG. 1 is an illustration of an exemplary electric vehicle according to the present disclosure.

FIG. 1 illustrates an electric vehicle in the form of a bus 10. Electric bus 10 may include a body 12 enclosing a space for passengers. In some embodiments, bus 10 may be a low-floor electric bus. As is known in the art, in a low-floor bus there may be no stairs at the front and/or the back doors of the bus. Bus 10 may include batteries 14 that store electrical energy to power the bus 10. These batteries 14 may be positioned at any location in the bus 10. In some embodiments, the batteries 14 may be positioned in cavities located under the floor of the bus 10, and may be accessible from below the bus 10. In some embodiments, the batteries 14 may be lithium titanate batteries configured for fast charging. In general, batteries 14 may include any chemistry (for example, lead-acid, nickel cadmium, nickel metal hydride, lithium ion, zinc air, etc.). In some examples, the batteries 14 may be charged at a rate of about 500 kW, although other suitable charge rates, such as, e.g., 30 kW to 5000 kW are also contemplated. Such charge rates may vary or remain steady during a charging process. Bus 10 may also include components such as an HVAC system 18 to cool and/or heat the passenger cabin, and a radiator 22 to cool the heat producing components of bus 10.

A charging interface 16 may be provided on the roof of the bus 10 to charge the batteries 14. The charging interface 16 may include components that interface with an external charging station 30 to charge the batteries 14. These components may include a charging blade 16a and an alignment scoop 16b. The alignment scoop 16b may align and direct a charging brace (not shown) of the external charging station 30 towards the charging blade 16a to electrically connect them and charge the batteries 14.

Figure 2:
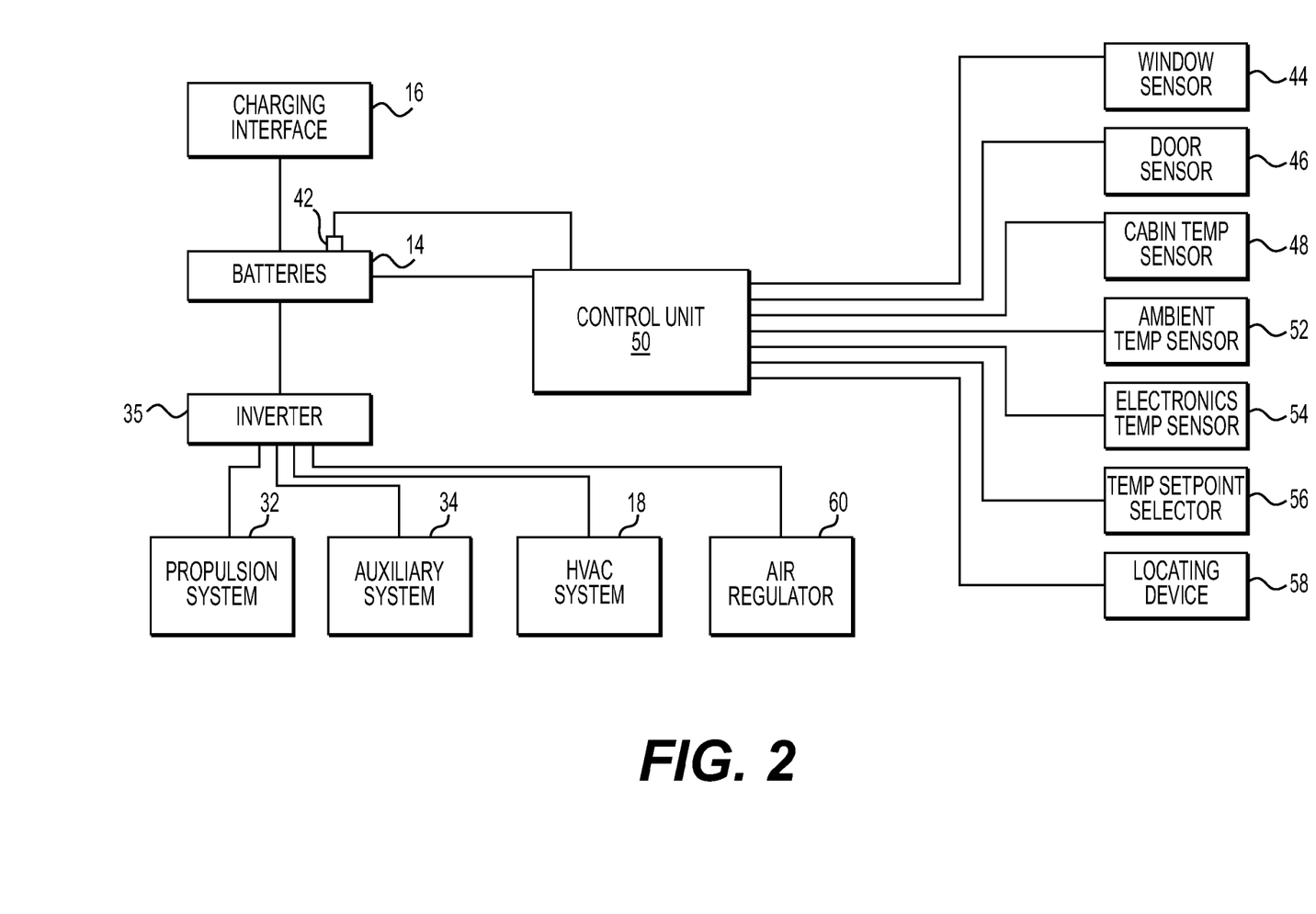
FIG. 2 is a schematic illustration of several exemplary systems of the electric vehicle of FIG. 1.

Referring to FIGS. 1 and 2, bus 10 may include several components and systems that assist in its functioning.

In some embodiments, high voltage DC power from the batteries 14 may be converted into 3-phase AC power using an inverter 35 and directed to one or more electrical loads. The electrical loads powered by batteries 14 may include a propulsion system 32, HVAC system 18, and an auxiliary system 34. Propulsion system 32 may include a powertrain that is powered by an electric motor. In some examples, the propulsion of bus 10 may be powered solely by batteries 14, or by batteries 14 and another suitable power source (not shown), such as, e.g., a combustion engine.

HVAC system 18 may include, among other components, an air circulation system (e.g., a blower, conduits, vents), an air conditioning (AC) unit having a compressor, condenser, evaporator and other conventional components, and an electric heater. Each of the components of HVAC system 18 may draw energy from batteries 14 and inverter 35. The blower may be a conventional blower configured to direct fresh and/or recirculated air through the passenger cabin. The AC unit may be configured to absorb heat from air within the passenger cabin or from various electronics of bus 10 (e.g., batteries 14), and expel that heat to ambient air outside of bus 10. The heater may be configured to convert electrical energy to heat energy by any suitable mechanism, such as, e.g., resistive heating elements. Auxiliary system 34 may be configured to withdraw heat from various electronics (e.g., the batteries 14) of bus 10 by circulating cooled fluid (e.g., water) between the electronics and a heat exchanger. In some examples, auxiliary system 34 may use the same AC unit as the HVAC system 18. Auxiliary system 34 may also be configured to heat batteries 14, for example, when the ambient temperature and/or the temperature of batteries 14 is below an ideal operating temperature range.

While in the embodiment shown in FIG. 2, HVAC system 18, propulsion system 32, and auxiliary system 34 are each shown as coupled to the same inverter 35, it is contemplated that additional inverters 35 may also be utilized in any suitable configuration as is known in the art. Further, each of propulsion system 32, auxiliary system 34, and HVAC system 18 may be coupled to a load regulator that may be configured to receive electrical energy from batteries 14 and/or inverter 35, and throttle down the amount of electrical energy that is available to each respective electric load (e.g., propulsion system 32, auxiliary system 34, and HVAC system 18, among other electrical loads), in accordance with instructions from a control unit 50. In some examples, the inverters 35 may function as load regulators. That is, inverters 35 may receive a signal that dictates an output energy limit to one or more electrical loads. Other mechanisms for achieving load regulation may include various software controls to ensure that switching frequency and output are adjusted to prevent excessive energy consumption. For example, control unit 50 may monitor available power and energy, and send commands or requests to one or more inverters 35 to regulate the electrical loads of the bus 10.

Control unit 50 may control various operations of the bus 10. Control unit 50 may include a collection of several mechanical, electrical, and integrated circuit devices (for example, computational units, A/D converters, memory, switches, actuators, fuses, etc.) that function collectively to control the operation of the bus 10. The control unit 50 may control the operation of the bus 10 based on several inputs from the bus 10.

These inputs may include signals indicative of operational parameters of the bus 10. The signals indicative of operational parameters may include, among others, whether one or more doors 26 or windows 28 is open or closed, a temperature of the passenger cabin, a temperature of ambient air outside of bus 10, a state of charge of batteries 14, a running condition of auxiliary system 34, a location of bus 10, a proximity of bus 10 to a next charging station along a route of bus 10, and a desired temperature selected by an operator of bus 10. Various sensors may measure these parameters and direct them as inputs to the control unit 50.

A sensor 42 may be configured to measure a state of charge (SOC) of batteries 14 by any suitable mechanism and send a signal indicative of the measured state of charge to control unit 50. The sensor 42 may communicate charge status and vehicle rapid charge capabilities to control unit 50 for characterization of energy availability. The route can be fixed, controlled using GPS guidance, or spontaneous. The control unit 50 may determine how much energy the batteries 14 can collect during time available at a charging station. The control unit 50 may be configured to predict a range of bus 10 based on charge status, energy availability, and predicted energy availability obtained by transfer of charge from upcoming charging stations. In some embodiments, a bus 10 that is running behind schedule can skip or limit time spent at a charging station based on a prediction of energy required to reach a subsequent energy station and/or the energy available at a subsequent energy station.

Control unit 50 may also be coupled to one or more window sensors 44 and door sensors 46 to enable control unit 50 to determine a state of windows 28 and doors 26 of bus 10 (e.g., whether they are open or closed). Control unit 50 may also be coupled to various temperature sensing devices, including, a cabin temperature sensor 48 configured to measure a temperature of the passenger cabin, an ambient temperature sensor 52 configured to measure the temperature of ambient air outside of bus 10, and an electronics temperature sensor 54 configured to measure a temperature of one or more electronics components (e.g., batteries 14) of bus 10. A temperature selector 56 may be configured to receive a user-selected temperature setpoint from an operator of bus 10. The temperature selector 56 may be any suitable mechanism, e.g., dials, buttons, touchscreens, or the like, that enables a driver or other person to indicate user-selected temperature setpoint for the passenger cabin that control unit 50 may use to control the HVAC system 18. In some embodiments, temperature selector may receive a remote indication of a temperature setpoint, for example, from a third party. The third party may be a command center or other entity that may set temperature setpoints for multiple vehicles in a fleet of vehicles.

Control unit 50 may also be coupled to a locating device 58, such as, e.g., a GPS device, that is configured to determine a position of bus 10 in real-time. Locating device 58 may communicate this location information to control unit 50.

HVAC system 18 may be configured to utilize both fresh, ambient air, and recirculated cabin air when maintaining the temperature of the passenger cabin. Control unit 50 may be coupled to an air regulator 60 that is configured to adjust the ratio of fresh air to recirculated air used by HVAC system 18 and/or directed into the passenger cabin. Air regulator 60 may be an electrically actuated flap, door, valve, or other suitable member, that is configured to adjust the ratio of fresh air to recirculated air based on a command from control unit 50.

HVAC Control During Charge Cycle

Figure 3:
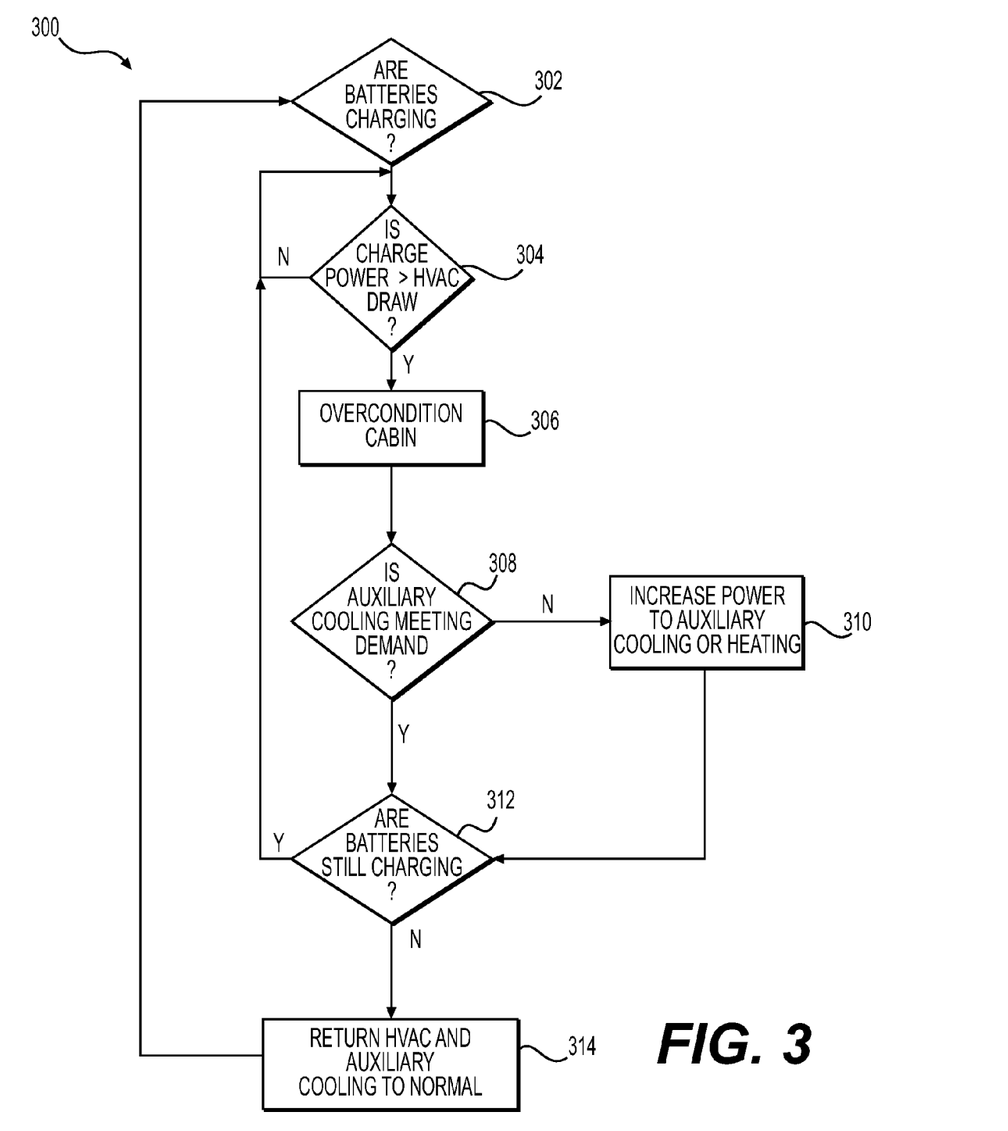
FIGS. 3 and 4 are flow charts illustrating different methods according to exemplary embodiments of the present disclosure.

FIG. 3 depicts a flowchart of an exemplary control method executed by control unit 50. A method 300 may start at step 302, where control unit 50 may determine if bus 10 is docked at a charging station 30 (as shown in FIG. 1) and/or whether batteries 14 are being charged based on an input from the sensor 42 or other appropriate sensor. If control unit 50 determines that the batteries 14 are being charged, method 300 may proceed to step 304, where control unit 50 may determine whether the charge power from charging station 30 is greater than any critical loads and the maximum draw of HVAC system 18. If the charge power or the rate at which batteries 24 are charging are sufficient to satisfy any critical loads required to operate bus 10 and is greater than the maximum electrical draw of HVAC system 18, the control unit 50 may remove any power limits or regulation previously placed on the HVAC system 18, and may proceed to step 306. The electric loads of bus 10 deemed critical during a charge state may be different than those electric loads of bus 10 that are deemed critical when bus 10 is in a driving mode. Critical electric loads during a charge state of bus 10 may include one or more of maintaining one or more different battery voltage systems (e.g., three battery voltage systems), coolant pumps, lights, warning buzzers, air compressors, and low voltage power loads. Triggering over-conditioning of the passenger cabin only when the HVAC system 18 was previously de-rated due to route length or operating conditions may decrease charging efficiency when bus 10 is charging for only a predetermined period of time (e.g., a scheduled 5 to 10 minutes while on a given route).

At step 306, control unit 50 may adjust the temperature setpoint for the passenger cabin to over-condition the passenger cabin while batteries 14 are charging. Over-conditioning the passenger cabin utilizing grid energy during a charge cycle may reduce energy consumption by the HVAC system 18 once bus 10 undocks from the charging station 30. Over-conditioning the cabin may slightly increase the charging time required to achieve a desired SOC of batteries 14. However, this increase in charge time may be negligible or commercially acceptable for the potential energy savings and increased bus range achieved. When the passenger cabin is being cooled, control unit 50 may lower the temperature setpoint for the passenger cabin from the user-selected temperature setpoint while batteries 14 are charging. For example, control unit 50 may reduce the temperature setpoint of the cabin from the user-selected temperatures setpoint by, e.g., 1 to 15 degrees Fahrenheit. This may cause HVAC system 18 to cool the passenger cabin an additional amount in order to reduce the on-route demand on HVAC system 18 on hot days. This may reduce the energy required to meet cooling demands when batteries 14 are not being charged.

When the passenger cabin is being heated, control unit 50 may raise the temperature setpoint from the user-selected temperature setpoint by, e.g., 1 to 15 degrees Fahrenheit, for the passenger cabin while batteries 14 are charging. In some examples, the amount of over-conditioning of the passenger cabin may be adjusted based on the ambient temperature. For example, as the ambient temperature diverges from an ideal cabin temperature, such as, e.g., room temperature or 72 degrees Fahrenheit, the level of over-conditioning may increase. In other examples, as the ambient temperature approaches an ideal cabin temperature, the level of over-condition ing may decrease or may be zero.

From step 306, method 300 may proceed to step 308, where control unit 50 may determine whether one or more auxiliary cooling or heating needs are being met. For example, control unit 50 may determine whether the temperature of batteries 14 or other power electronics (e.g., inverters, DC-DC converters, electric motors, air compressors, auxiliary power units, engines, fuel cells, and/or turbines) are at an ideal operating temperatures or within ideal operating temperature ranges. Ideal operating temperatures of the various power electronics may vary. In one example, power electronics may have an ideal operating range from 10 degrees Celsius and 40 degrees Celsius. If the control unit 50 determines that the auxiliary cooling or heating needs of bus 10 are being met (e.g., if the temperature of batteries 14 is within an ideal operating range), method 300 may proceed to step 312.

If, however, control unit 50 determines that the auxiliary system 34 has not kept up with demand while bus 10 is on a given route (e.g., if the temperature of batteries 14 is outside of an ideal operating temperature range), method 300 may proceed to step 310 where control unit 50 may direct additional energy to auxiliary system 34 such that it may be over-actuated in an attempt to recover during the charge cycle. Directing additional power to the auxiliary system 34 may include increasing the speed of a circulation fluid flowing through auxiliary system 34, increasing the speed of a compressor motor to improve heat exchange, increasing the heating output of an electric heater, or any other suitable temperature control mechanism. From step 310, method 300 may proceed to step 312.

At step 312, control unit 50 may determine whether batteries 14 are still charging, and if so, method 300 may return to step 304. If, however, control unit 50 determines at step 312 that the batteries 14 are no longer charging, method 300 may proceed to step 314, where control unit 50 may direct both HVAC system 18 and auxiliary system 34 to return to normal operating parameters. That is, control unit 50 may no longer instruct HVAC system 18 to over-condition the passenger cabin, and may no longer instruct auxiliary system 34 to over-actuate to cool batteries 14. From step 314, method 300 may return to step 302. That is, once a charge cycle has completed, the HVAC system 18 and auxiliary system 34 may return to normal operation for another drive cycle, and until a next charge cycle.

Method 300 may reduce the load on HVAC system 18 once bus 10 undocks from charging station 30 which may end a charge cycle of batteries 14. Thus, method 300 may increase the range that bus 10 can travel by taking advantage of the relatively high or unlimited supply of power at charging stations 30.

SOC-Dependent HVAC Control

Figure 4:
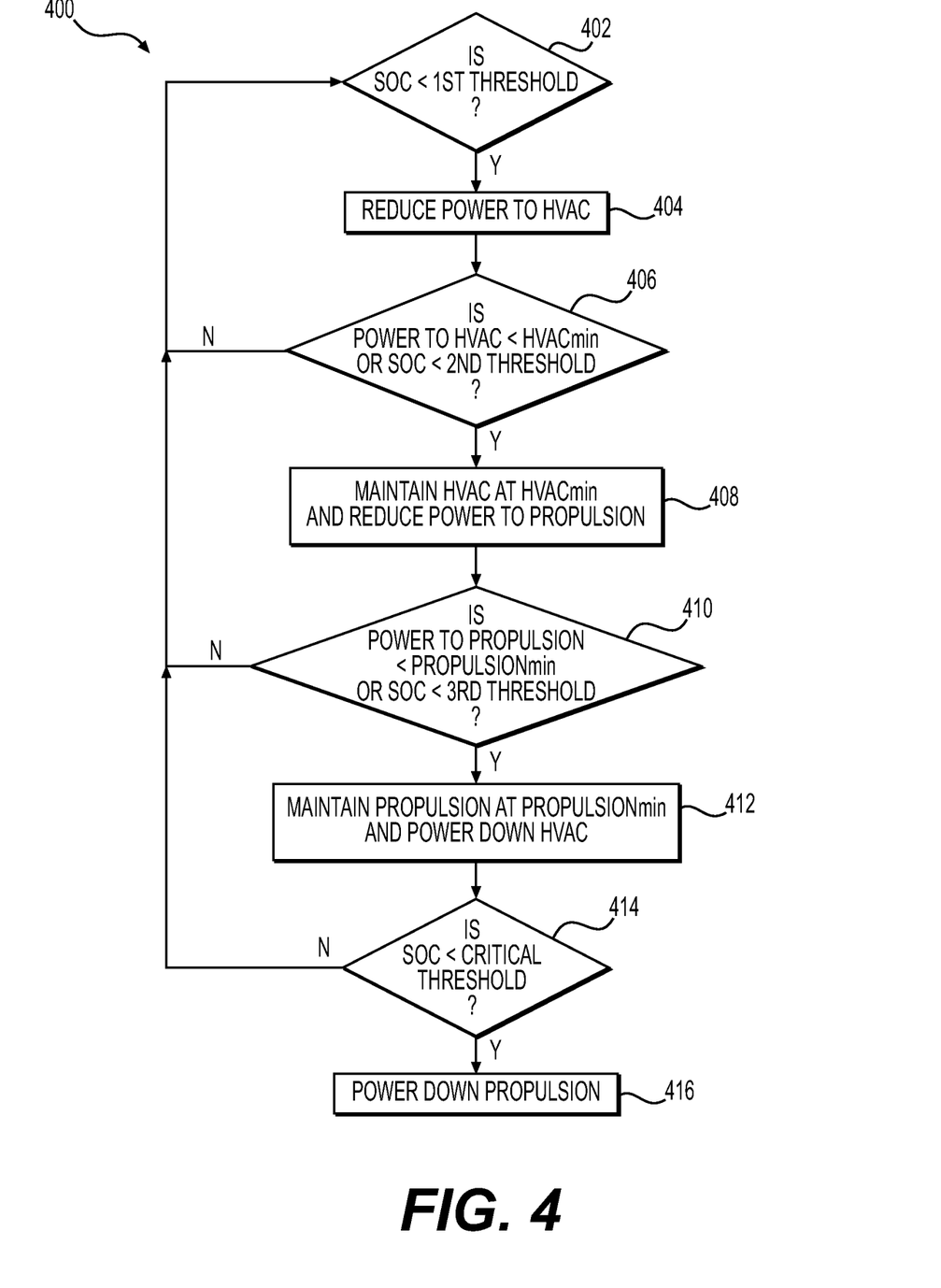

A method 400 is illustrated in FIG. 4. In some examples, the HVAC system 18 may be the second largest consumer of energy on bus 10 after propulsion system 32. Due to the reduced infrastructure for vehicle charging and the overall reduction of available energy that is stored onboard an electric bus, the HVAC system 18 may need to be power limited to ensure that the bus 10 can reach a charge station. During the majority of operating conditions, the HVAC system 18 may be provided with a power limit that is well above what it needs to operate. As the SOC of bus 10 decreases to certain thresholds, HVAC power consumption may be reduced to conserve more energy for propulsion system 32. This reduction in available power to HVAC system 18 may be configured to slowly degrade the performance of the HVAC system 18, sacrificing relatively small or reasonable amounts of passenger comfort in order to keep the bus 10 in service.

Method 400 may start at step 402, where control unit 50 may determine whether a state of charge of batteries 14 is below a first SOC threshold. If the SOC of batteries 14 is below the first SOC threshold, the method may proceed to step 404, where control unit 50 may send a signal to the one or more load regulators to limit the power available to one or more components of HVAC system 18. The first SOC threshold may be a value selectable from, e.g., 5 to 50 percent SOC, although other suitable values are also contemplated. At step 404, control unit 50 may set one or more power limit thresholds. In one example, control unit 50 may reduce the amount of power available to HVAC system 18 to a lower level than is otherwise normally available. In other examples, control unit 50 may gradually decrease the power limit of HVAC system 18 over time. In one example, the power limit of HVAC system 18 may decrease at the same rate that the SOC of batteries 14 decreases. While at a lower power limit, HVAC system 18 may experience a decrease in performance and draw less energy at any given time than before the power limit was set. For example, the compressor of the AC unit may not be able to run at desired levels, reducing the cooling abilities of HVAC system 18. Alternatively, control unit 50 may reduce the power available to an electric heater or of a blower associated with HVAC system 18, reducing the performance of those components as well. In some examples, control unit 50 may implement the power-limited mode by sending an instruction to a load regulator to throttle electrical power available to HVAC system 18. In other examples, control unit 50 may instead operate HVAC system 18 at lower levels (e.g., at lower compressor and/or blower speeds).

From step 404, method 400 may then proceed to step 406, where control unit 50 may determine whether the power limit of HVAC system has reached an HVAC minimum threshold, or whether the SOC of batteries 14 are below a second SOC threshold that is lower than the first SOC threshold. The second SOC threshold may be a value selectable from, e.g., 1 to 25 percent SOC, although other suitable values are also contemplated. If one of the conditions above are satisfied, method 400 may proceed to step 408, where control unit 50 may maintain HVAC system 18 at an HVAC minimum threshold operating level, and may reduce the power available to propulsion system 32. The HVAC minimum threshold operating level may correspond to various minimum passenger level requirements as mandated by the local jurisdiction governing bus 10. Thus, as the overall SOC of batteries 14 continues to diminish, the power limit to HVAC system 18 may be reduced further until the AC unit of the HVAC system 18 can no longer operate due to minimum requirements. At this point, the control unit 50 may shut off or substantially reduce fresh air intake into the passenger cabin via air regulator 60 to minimize heat exchange, but may keep the blower or fans running so that the air inside the passenger cabin does not get stagnant. At step 408, control unit 50 may also send a signal to a load regulator or otherwise limit the power available to or used by propulsion system 32 (e.g., a motor of propulsion system 32). The power limits set for propulsion system 32 may decrease maximum speed and/or acceleration capabilities of bus 10, and may force the driver of bus 10 to operate bus 10 in a more energy efficient manner. For example, the power limit may be set such that the bus 10 is unable to achieve speeds greater than, e.g., 5 to 45 mph or any other suitable speed threshold, at step 408. In other examples, control unit 50 may limit the acceleration of bus 10 at step 408. That is, during the power-limited setting at step 408, the acceleration of bus 10 may be limited to a minimum threshold acceleration set by control unit 50 irrespective of the amount of acceleration requested by a driver of bus 10 (e.g., irrespective of an amount of pressure applied to an acceleration pedal). The minimum threshold acceleration may be less than the maximum accelerations levels that may be achieved without the power restrictions placed on propulsion system 32.

From step 408, method 400 may proceed to step 410, where control unit 50 may determine whether the power limit of propulsion system 32 has reached a propulsion minimum threshold operating level, or whether the SOC of batteries 14 are below a third SOC threshold that is lower than the second SOC threshold. The third SOC threshold may be a value selectable from, e.g., 1 to 15 percent SOC, although other suitable values are also contemplated. If one of the conditions above are satisfied, method 400 may proceed to step 412, where control unit 50 may maintain propulsion system 32 at the propulsion minimum threshold operating level, and may reduce the power available to HVAC system 18 below the HVAC minimum threshold operating level. The fans or blowers of the HVAC system 18 may continue to run at progressively lower levels, or the HVAC system 18 may be completely disabled in an effort to allow bus 10 to reach a charge station.

From step 410, method 400 may proceed to step 414, where control unit 50 may determine if the SOC of batteries 14 is below a critical operating threshold (e.g., 1 to 5 percent OC) that is lower than the third SOC threshold. The critical operating threshold may represent the point at which bus 10 can no longer power both the propulsion system 32 and one or more critical operating loads. The critical operating loads may be systems that are required to be powered at all times, including, but not limited to, steering and braking systems, fire protection, egress systems, vehicle emergency lighting, low voltage power and lighting, crash mitigation systems, and/or safety restraint systems (e.g., airbags). The power draw of these critical loads may need to be accounted for to determine available power for vehicle propulsion and cabin conditioning, and may be given priority over both the propulsion system 32 and HVAC system 18. If the control unit 50 determines that the SOC of batteries 14 is below the critical operating threshold, method 400 may proceed to step 416, where control unit 50 may power down the propulsion system of bus 10. In some examples, after propulsion system 32 is powered down, one or more components of HVAC system 18 may be activated to improve passenger comfort in the disabled bus 10.

At any aforementioned point in method 400, control unit 50 may adjust the various thresholds or parameters based on an expected time to a next charge cycle. For example, control unit 50 may be configured to determine a real-time position of bus 10 based on input from locating device 58. Control unit 50 may be configured to adjust the values of the various SOC thresholds based one or more of an actual distance to a next charging station, an estimated time of arrival at a next charge station, traffic along a route to the next charging station, among others. For example, SOC thresholds may be raised as the distance between bus 10 and the next charging station increases, as the estimated time of arrival at the next charging station increases, or as traffic along the route to the next charging station increases. The increase in SOC thresholds based on increases in the aforementioned parameters may account for additional time that the bus 10 must operate without a charge. On the contrary, SOC thresholds may be lowered as these aforementioned values decrease, as bus 10 may not have to operate for significant periods of time until a next charge.

Figure 5:
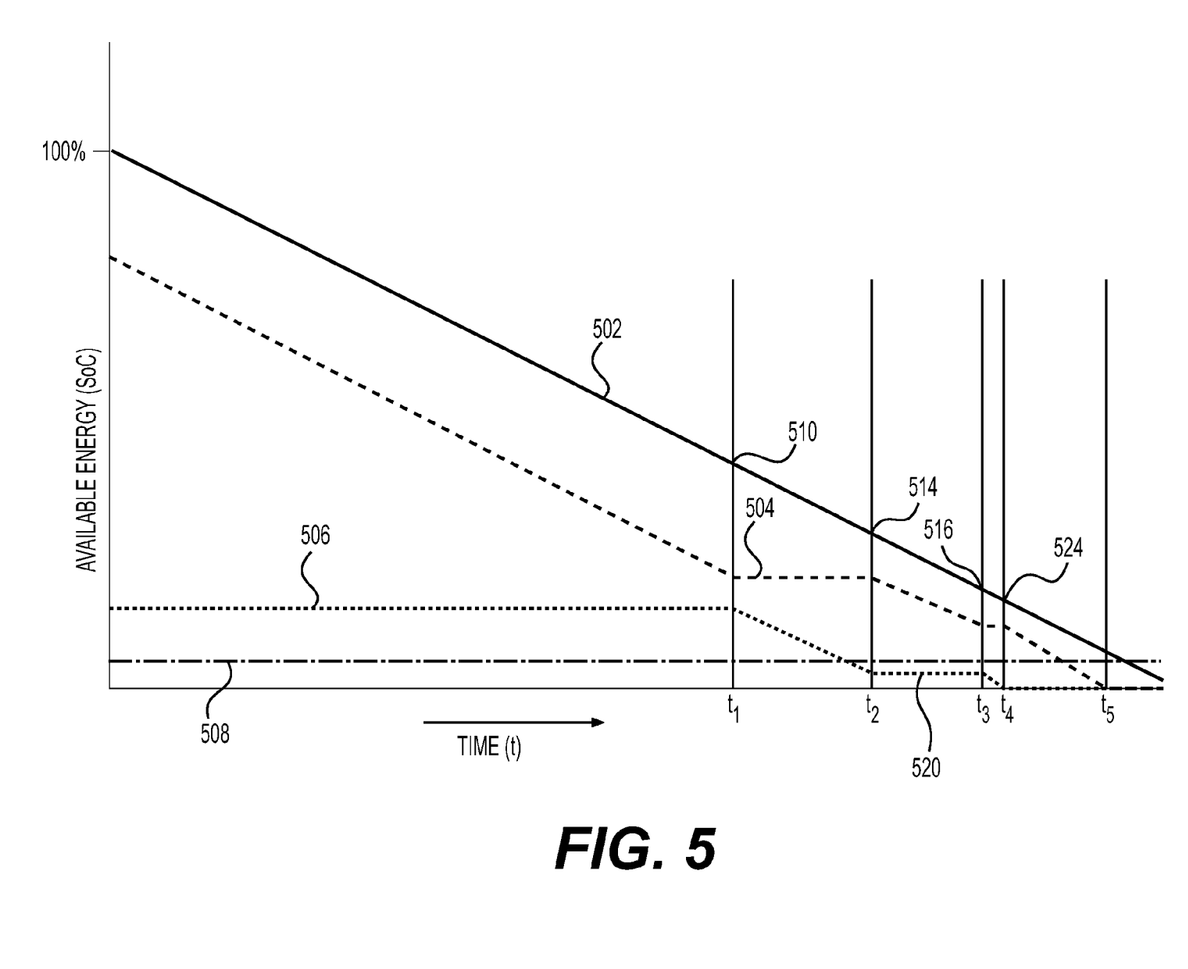
FIG. 5 is a graphical illustration of an implementation of the method of FIG. 4.

FIG. 5 is a graphical illustration of an implementation of method 400 over time t. The SOC of batteries 14 measured by sensor 42 is shown as an energy curve 502. The energy available to propulsion system 32 is shown as an energy curve 504, while the energy available to the HVAC system 18 is shown as an energy curve 506. The critical operating threshold described with reference to method 400 is shown graphically as an energy threshold 508. Before time $t_1$, bus 10 may be in a normal operating mode such that no limits are placed on the energy draw of the propulsion system 32 or the HVAC system 18 of bus 10. Each system may be operated to their full capacity or may be limited according to other examples of the present disclosure. As bus 10 operates under normal conditions, drawing electrical energy stored in batteries 14, the SOC of batteries 14 may steadily decrease until it reaches first SOC threshold 510. Once control unit 50 determines that the SOC of batteries 14 is below the first SOC threshold, control unit 50 may limit energy available to HVAC system 18 (energy curve 506) in order to maintain the propulsion system 32 at normal operating conditions. The power restrictions set on HVAC system 18 may cause a decrease in performance, such as, e.g., reduced heat exchange capabilities of the AC unit, reduced heating output of an electric heater, and/or reduced performance of a blower used for recirculation.

The control unit 50 may maintain this power restricted state, allowing propulsion system 32 to operate with no restriction but restricting power to HVAC system 32 until the SOC of batteries 14 reaches a second SOC threshold 514 at time $t_2$. At that point, control unit 50 may restrict the power available to propulsion system 32 (energy curve 504), while maintaining HVAC system 18 at the minimum operating level discussed above with respect to step 408 of method 400. The energy available to HVAC system 18 (energy curve 506) at the HVAC minimum operating level may be insufficient to operate the compressor of an AC unit, and may only be sufficient to recirculate air throughout the passenger cabin. Additionally, propulsion system 32 may be power-restricted once the SOC of batteries 14 falls below the second SOC threshold 514. In some examples, propulsion system 32 may not be able to achieve otherwise reachable high-speeds or accelerations while power-restricted, forcing the driver of bus 10 to operate bus in a more energy-efficient manner.

At time $t_3$, when the SOC of batteries 14 is below the third SOC threshold 516, control unit 50 may maintain propulsion system 32 (energy curve 504) at the propulsion minimum operating level, and may reduce the power available to HVAC system 18 (energy curve 506) below the HVAC minimum threshold operating level. Once the SOC of batteries 14 falls below a fourth SOC threshold 524 at time $t_4$, all power that was previously being diverted to HVAC system 18 may instead be diverted to propulsion efforts in order to help bus 10 reach a next charge station. Thus, bus 10 may drive without any air recirculation or cabin conditioning until time $t_5$, when the SOC of batteries 14 falls below the critical operating threshold 508. Beyond this point, propulsion of bus 10 at any speed may be unsafe as batteries 14 may no longer be able to support steering, braking, and/or other critical functions of bus 10, and power may be cut off to propulsion system 32. After power is cut off to propulsion system 32, control unit 50 may divert some of the remaining energy from batteries 14 to HVAC system 18 to maintain passenger comfort.

Adjustable Temperature Control Window

Figure 6:
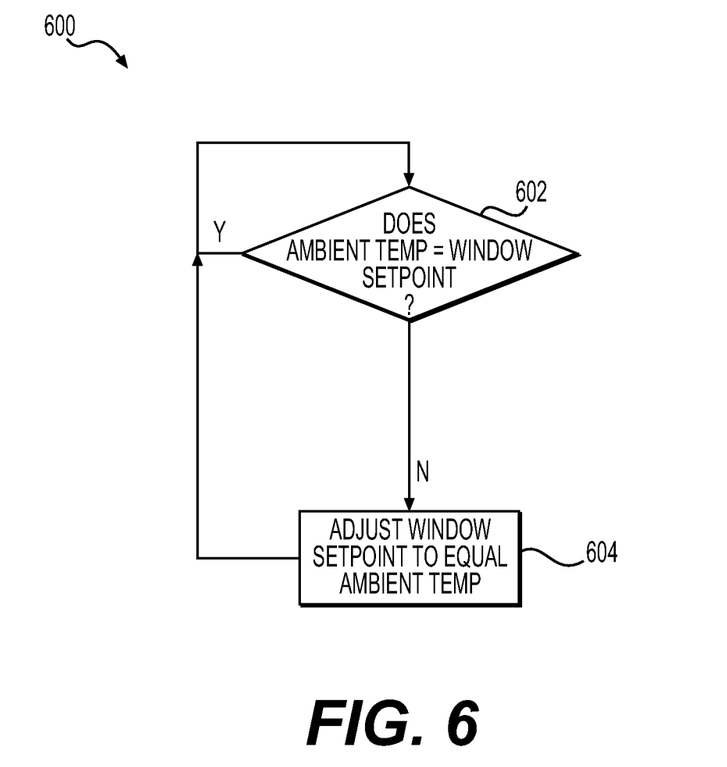
FIGS. 6 and 7 are flow charts illustrating different methods according to exemplary embodiments of the present disclosure.

A method 600 is shown in FIG. 6. Control unit 50 may send signals to HVAC system 18 to either cool or heat the passenger cabin based on a desired temperature setpoint that may be selected by, e.g., the driver of bus 10 via the temperature setpoint selector 56. Control unit 50 may permit a driver to select a desired temperature within some temperature selection range, e.g., between 50 and 80 degrees Fahrenheit, although other suitable ranges may also be utilized. However, giving drivers complete control to select any temperature within this temperature selection range, irrespective of the ambient temperature, may be inefficient. The temperature selection range may represent the totality of setpoint temperatures selectable by temperature setpoint selector 56. Thus, method 600 may limit the temperatures selectable within the temperature selection range based on ambient air temperature measured by ambient temperature sensor 54. Control unit 50 may achieve this in any suitable manner.

In one example, control unit 50 may provide a driver with a temperature selection window that is based on the ambient temperature. The temperature selection window may include a range of temperatures that is a subset of the entire temperature selection range that may be selected by the driver when no restrictions are applied. In one example, the temperature selection window within the overall temperature selection range of the bus 10 may be plus or minus 1 to 10 degrees Fahrenheit of the ambient temperature, although other suitable ranges are also contemplated.

Method 600 may begin at step 602, where control unit 50 may determine if the ambient temperature is equal to a window setpoint temperature of a currently available temperature selection window. The currently available temperature selection window may represent the current subset of the entire temperature range available to the driver or other person. The window setpoint temperature may be based on the ambient temperature outside of bus 10, and may correspond to a range of temperatures selectable within a temperature selection window corresponding to that window setpoint temperature. In one example, the window setpoint temperature may be the center value of the temperature selection window. For example, the temperature selection window may include temperatures that are plus or minus 1 to 10 degrees Fahrenheit of the window setpoint temperature. In other examples, such as when the ambient temperature is relatively cold, the window setpoint temperature may be closer to a lower end of the temperature selection window than a higher end of the temperature selection window. This may be based upon certain minimum required temperatures of the passenger cabin. For example, control unit 50 may set a minimum temperature of the passenger cabin, e.g., 50 degrees Fahrenheit, to ensure that passengers are not too cold while within the passenger cabin. In some examples, the window setpoint temperature may be outside of a temperature selection window corresponding to that particular setpoint (e.g., a temperature selection window of 50 to 60 degrees Fahrenheit may correspond to an ambient temperature or window temperature setpoint of 10 degrees Fahrenheit). On the contrary, when the temperature is relatively warm, the window setpoint temperature may be closer to a higher end of the temperature selection window than a lower end of the temperature selection window. For example, control unit 50 may set a maximum temperature of the passenger cabin, e.g., 80 degrees Fahrenheit, to ensure that passengers do not overheat while they are within the passenger cabin. Control unit 50 may be configured to store and/or access a lookup table or map that corresponds different temperature selection windows with different ambient temperatures and/or window setpoint temperatures.

If the ambient temperature measured at step 602 does not equal the setpoint temperature, method 600 may proceed to step 604, where control unit may readjust the setpoint temperature to equal the measured ambient temperature. This shift in the setpoint temperature may change the temperature selection window available to an operator of bus 10. The method may return to step 602 after adjusting the setpoint at step 604, forming a closed feedback loop.

Method 600 may provide drivers of bus 10 with some degree of temperature control, while also providing them more energy efficient setpoints based on the current ambient conditions. Method 600 may be commercially viable, as passengers tend to be clothed appropriately for the climate in which they live. For example, when it is cold (e.g., during winter months), passengers may be wearing winter clothing such that the internal temperature in the bus may be set for a person dressed in such winter clothing. On the contrary, when it is warm or hot (e.g., during summer months), passengers tend to dress appropriately in warm-weather clothing.

Fresh Air Intake Ratio

During operation of bus 10, various ratios of fresh air to recirculated air may be utilized when controlling the passenger cabin environment. This ratio may be optimized based on ambient conditions. In some examples, fresh air intake may be substantially reduced when bus 10 is in a garage or tunnel to prevent contaminated air from entering the passenger cabin. Adjusting the ratio of fresh air to recirculated air directed to the passenger cabin may also have energy efficiency advantages.

Figure 7:
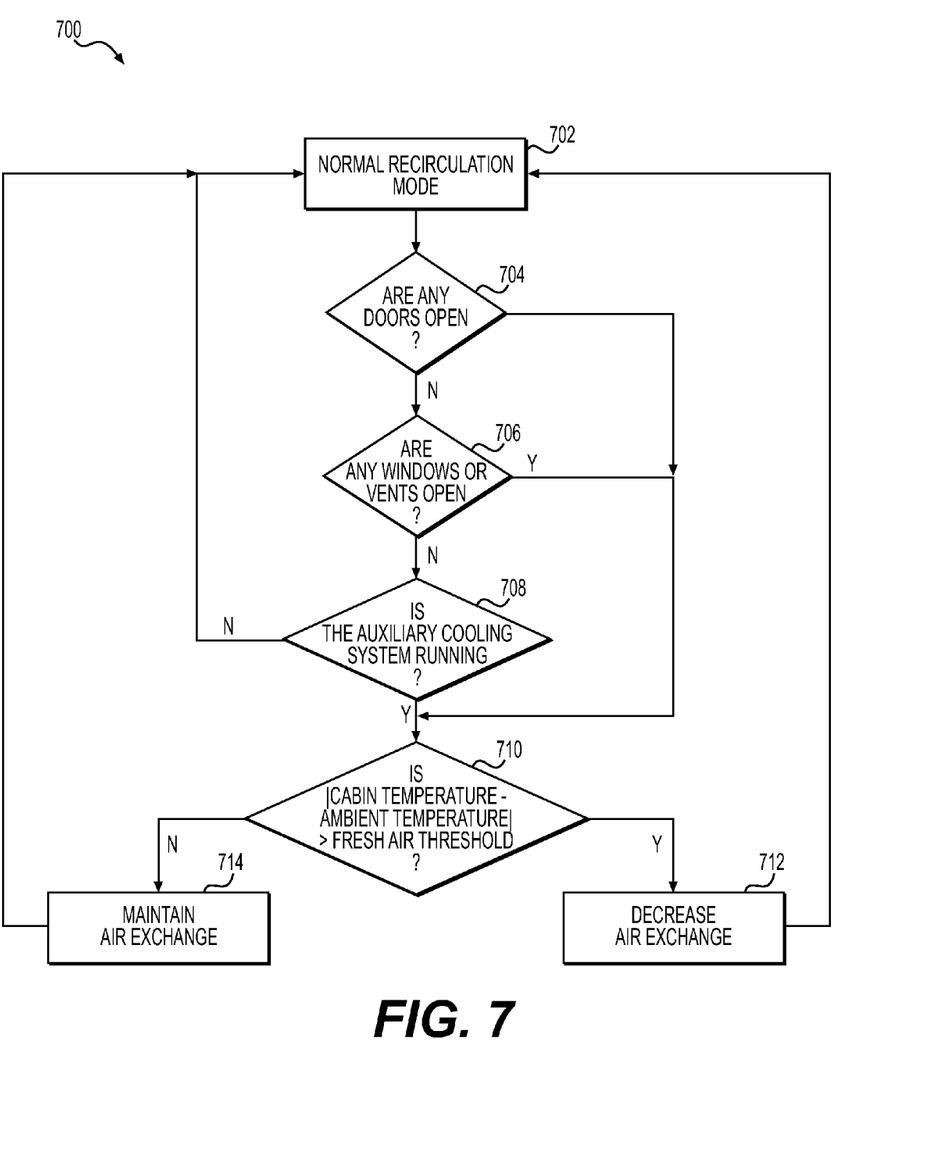

A method 700 is shown in FIG. 7. Method 700 may begin at step 702, where control unit 50 may operate HVAC system 18 in a normal recirculation mode. The normal recirculation mode may periodically adjust the ratio of fresh air intake and recirculation air intake based on any suitable parameters, e.g., by adjusting intake ports, air vents, or flow modifying baffles or flaps. The method may proceed to step 704, where control unit 50 may determine whether any of doors 26 are open based on a signal from door sensor 46. If control unit 50 determines that none of doors 26 are open, method 700 may proceed to step 706, where control unit 50 may determine whether any windows or vents are open based on a signal from window sensor 44. If control unit 50 determines that no windows or vents are open, method 700 may proceed to step 708, where control unit 50 may determine whether the auxiliary system 34 is operating. In some examples, if doors 26 or windows 28 are open for a threshold amount of time, control unit 50 may reduce the power available to HVAC system 18, or may shut off HVAC system 18 entirely. This can occur, when, e.g., a driver is idling the electric bus 10 during a non-charge cycle stopover, and leaves the bus 10 in an "ON" condition. If at step 708, the auxiliary system 34 is not operating, the method may return to step 702.

If, however, one or more doors 26 are determined to be open at step 704, if one or more windows or vents are determined to be open at step 706, or if the auxiliary system 34 is determined to be running at step 708, the method may proceed to step 710. At step 710, control unit 50 may determine whether the absolute value of the difference between the temperature in the passenger cabin (based on a signal from cabin temperature sensor 48), and the ambient temperature (based on a signal from ambient temperature sensor 52) is greater than a fresh air threshold value. Comparing the difference between cabin temperature and the ambient temperature may help control unit 50 determine if additional fresh air intake will help or hurt the objectives of HVAC system 18. For example, when the difference between the cabin temperature and the ambient temperature is relatively low (e.g., within 5 degrees Fahrenheit), the HVAC system 18 may not be significantly burdened by maintaining fresh air intake at normal levels. On the contrary, if the difference between the cabin temperature and the ambient temperature is relatively high (e.g., greater than 5 degrees Fahrenheit), additional fresh air mixing may be detrimental to the performance of HVAC system 18, as the ambient air may need to be significantly conditioned to reach desired temperatures.

Thus, if the absolute value of the difference between the cabin temperature and ambient temperature is greater than the fresh air threshold, the method may proceed to step 712 where control unit 50 may temporarily decrease fresh air exchange until the triggering event at one or more of steps 704, 706 or 708 has ended. The temporary decrease in fresh air exchange can be achieved in any suitable manner. In one example, control unit 50 may send a signal to air regulator 60 to decrease the ratio of fresh air to recirculated air being used to condition the passenger cabin, by, e.g., adjusting the position of a valve, flap, or door. In another example, control unit 50 may decrease fresh air exchange by decreasing the speed of air recirculation by HVAC system 18. The decrease in circulation may be achieved, by, e.g., temporarily decreasing the speed of a blower or fan. Control unit 50 also may decrease power to the HVAC system at step 712 to prevent the excessive loss of conditioned air in the passenger cabin through an open door, window, or vent. Additionally, because the auxiliary system 34 may utilize the same AC unit to cool the power electronics of bus 10 as the HVAC system 18, when auxiliary system 34 is cooling batteries 14, there may be less energy available to condition the air in the passenger cabin. Therefore, a temporary reduction in fresh air exchange may allow for control unit 50 to maintain a desired temperature of the passenger cabin more efficiently by reducing the amount of fresh air that needs to be conditioned. After step 712, method 700 may return to step 702.

If at step 710, the absolute value of the difference between the cabin temperature and ambient temperature is less than the fresh air threshold, method 700 may instead proceed to step 714, where control unit 50 may maintain the ratio of fresh air to recirculated air entering the passenger cabin. That is, when the difference in temperature between ambient air and cabin air is small, maintaining the ratio of fresh air to recirculated air being directed to the passenger cabin may not significantly burden the HVAC system 18. After step 714, method 700 may return to step 702.

The methods 300, 400, 600, and 700 may all be utilized on the same electric vehicle (e.g., electric bus 10). That is, a control unit 50 of a given electric bus 10 may be programmed to implement one or more of methods 300, 400, 600, 700. The control unit 50 may be configured to implement method 300 when electric bus 10 is charging (as shown in FIG. 1), and may implement one or more of methods 400, 600, and 700 simultaneously while the electric bus 10 is driving (on-route).

Range is an important factor for electrically-powered buses. The examples disclosed herein are directed toward various methods and devices that may improve the efficiency of HVAC systems of electric buses to enable more energy to be diverted to propulsion efforts. In an electric bus, it is may be relatively easy to waste energy by inefficiently cooling or heating the passenger cabin. Inefficiently operating HVAC systems may lead to wasted energy reducing the range of bus 10. As opposed to some control systems that may operate HVAC as a standalone system, various examples of the present disclosure may operate the HVAC system as part of the bus's entire power control system. That is, methods of the present disclosure may control both the HVAC system and the propulsion system in an integrated fashion that considers the entirety of the bus's systems.

While principles of the present disclosure are described with reference to an electric bus, it should be understood that the disclosure is not limited thereto. Rather, the systems and methods described herein may be employed in any electric, hybrid, or combustion engine-powered vehicle (car, two wheeler, train, etc.). Those having ordinary skill in the art and access to the teachings provided herein will recognize additional modifications, applications, embodiments, and substitution of equivalents all fall within the scope of the embodiments described herein. Accordingly, the disclosure is not to be considered as limited by the foregoing description. For example, while certain features have been described in connection with various embodiments, it is to be understood that any feature described in conjunction with any embodiment disclosed herein may be used with any other embodiment disclosed herein.

We claim:

1. A method of controlling an electric vehicle, the electric vehicle having an HVAC system configured to condition a passenger cabin of the electric vehicle, and one or more batteries configured to provide energy to the HVAC system, the method comprising:
   receiving a user-selected temperature setpoint for the HVAC system;
   determining if the electric vehicle is being charged at a charging station;
   if the electric vehicle is being charged, automatically modifying the temperature setpoint by increasing or decreasing the temperature setpoint of the HVAC system from the user-selected temperature setpoint; and
   controlling an output of the HVAC system to achieve the modified temperature setpoint within a passenger cabin of the electric vehicle.

2. The method of claim 1, further including:
   receiving a temperature of the one or more batteries;
   absorbing heat from the one or more batteries via a cooling system or transferring heat to the one or more batteries via a heating system; and
   if the electric vehicle is being charged, increasing an output of the cooling system or the heating system if the temperature of the one or more batteries is outside of an ideal operating temperature range.

3. The method of claim 1, further including:
   determining whether a door or a window of the electric vehicle is open; and
   reducing an amount of power directed to the HVAC system if a door or window is determined to be open.

4. The method of claim 1, wherein automatically modifying the temperature setpoint includes decreasing the temperature setpoint from the user-selected temperature setpoint when the HVAC system is cooling the passenger cabin, and increasing the temperature setpoint from the user-selected temperature setpoint when the HVAC system is heating the passenger cabin.

5. The method of claim 1, wherein an amount of reduction or increase of the temperature setpoint from the user-selected temperature setpoint is based on the ambient temperature outside of the electric vehicle.

6. The method of claim 1, further including setting the temperature setpoint of the HVAC system back to the user-selected temperature setpoint after charging of the electric vehicle is complete.

7. The method of claim 1, wherein receiving a user-selected temperature setpoint includes selecting a temperature from a temperature setpoint window, wherein the temperatures presented in the temperature setpoint window are determined based on an ambient temperature outside of the vehicle.

8. The method of claim 7, wherein, when the ambient temperature is between a minimum threshold temperature and a maximum threshold temperature, the temperature setpoint window presents temperatures in a range that is centered at the ambient temperature outside of the vehicle.

9. The method of claim 8, wherein:
   when the ambient temperature is below the minimum threshold temperature, setting a lower end of the temperatures in the temperature selection window as the minimum threshold temperature; and
   when the ambient temperature is above the maximum threshold temperature, setting an upper end of the temperatures in the temperature selection window as the maximum threshold temperature.

10. The method of claim 1, further including determining a state of charge of the one or more batteries, and reducing the power directed to the HVAC system when the state of is below a first threshold.

11. The method of claim 10, wherein the electric vehicle further includes a propulsion system configured to propel the electric vehicle, wherein the method further includes reducing the power directed to the propulsion system when the state of charge of the one or more batteries is below a second threshold that is less than the first threshold.

12. The method of claim 11, further including disabling the cooling or heating capability of the HVAC system, and only allowing the HVAC system to recirculate air through the passenger cabin when the state of charge of the one or more batteries falls below a third threshold that is less than the second threshold.

13. The method of claim 1, wherein the electric vehicle further includes an air regulator configured to adjust a ratio of fresh air to recirculated air that is directed to the passenger cabin, wherein the method further includes sending a signal to the air regulator to decrease the ratio of fresh air to recirculated air directed to the passenger cabin if a control unit determines that a door, window, or vent of the electric vehicle is open.

14. The method of claim 13, wherein sending a signal to the air regulator includes sending the signal if the control unit further determines that a difference between the ambient temperature outside of the vehicle and a temperature within the passenger cabin is greater than a fresh air temperature threshold.

15. The method of claim 13, wherein the electric vehicle further includes a cooling system configured to absorb heat from the one or more batteries or a heating system configured to transfer heat to the one or more batteries, wherein the method further includes determining if the cooling system or the heating system is operating, and decreasing the ratio of fresh air to recirculated air directed to the passenger cabin if the cooling system or the heating system is operating.

16. A control system for an electric vehicle, comprising:
   an HVAC system configured to condition air within a passenger cabin of the electric vehicle;
   one or more batteries configured to provide energy to the HVAC system; and
   a control unit configured to:
      receive a user-selected temperature setpoint for the HVAC system;
      determine if the electric vehicle is being charged at a charging station;
      if the electric vehicle is being charged, automatically modify the temperature setpoint by increasing or decreasing the temperature setpoint of the HVAC system from the user-selected setpoint, wherein an amount of the increase or decrease in temperature is based on an ambient temperature outside the vehicle;
      if the electric vehicle is not being charged, set the temperature setpoint of the HVAC system to the user-selected setpoint; and
      control an output of the HVAC system to achieve the modified temperature setpoint within a passenger cabin of the electric vehicle when the vehicle is being charged.

17. The control system of claim 16, wherein the control unit is configured to allow a user to select a temperature for the user-selected temperature setpoint from a temperature setpoint window, wherein the temperatures presented in the temperature setpoint window are selected based on an ambient temperature outside of the vehicle.

18. A method of controlling an electric vehicle, the electric vehicle having an HVAC system configured to condition a passenger cabin of the electric vehicle, and one or more batteries configured to provide energy to the HVAC system, the method comprising:

selecting a temperature from a temperature setpoint window as a user-selected temperature setpoint, wherein the temperatures presented in the temperature setpoint window are selected based on an ambient temperature outside of the vehicle;

determining if the electric vehicle is being charged at a charging station;

if the electric vehicle is being charged, automatically modifying the temperature setpoint by increasing or decreasing the temperature setpoint of the HVAC system from the user-selected temperature setpoint, wherein an amount of the increase or decrease in temperature is based on the ambient temperature;

if the electric vehicle is not being charged, setting the temperature setpoint of the HVAC system to the user-selected setpoint; and controlling an output of the HVAC system to achieve the modified temperature setpoint within a passenger cabin of the electric vehicle when the vehicle is being charged.

19. The method of claim 18, further including;

determining whether a door or a window of the electric vehicle is open; and reducing an amount of power directed to the HVAC system if a door or window is determined to be open.

20. The method of claim 18, wherein the electric vehicle further includes a propulsion system configured to propel the electric vehicle, and the method further includes:

determining a state of charge of the one or more batteries;

reducing the power directed to the HVAC system when the state of charge falls below a first threshold value;

reducing the power directed to the propulsion system when the state of charge falls below a second threshold value that is less than the first threshold value; and disabling a cooling or heating capability of the HVAC system when the state of charge is less than a third threshold value that is less than the second threshold value.

* * * * *